United States Patent
Yang et al.

(10) Patent No.: US 9,521,654 B2
(45) Date of Patent: Dec. 13, 2016

(54) METHOD FOR ESTIMATING CHANNEL IN WIRELESS ACCESS SYSTEM AND APPARATUS FOR SAME

(71) Applicant: LG Electronics Inc., Seoul (KR)

(72) Inventors: Yoonoh Yang, Anyang-si (KR); Suhwan Lim, Anyang-si (KR); Manyoung Jung, Anyang (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 14/395,943

(22) PCT Filed: Oct. 25, 2012

(86) PCT No.: PCT/KR2012/008807
§ 371 (c)(1),
(2) Date: Oct. 21, 2014

(87) PCT Pub. No.: WO2013/165062
PCT Pub. Date: Nov. 7, 2013

(65) Prior Publication Data
US 2015/0181558 A1    Jun. 25, 2015

Related U.S. Application Data

(60) Provisional application No. 61/641,843, filed on May 2, 2012.

(51) Int. Cl.
*H04W 72/00* (2009.01)
*H04L 25/02* (2006.01)
(Continued)

(52) U.S. Cl.
CPC .......... *H04W 72/005* (2013.01); *H04L 5/005* (2013.01); *H04L 25/0226* (2013.01);
(Continued)

(58) Field of Classification Search
CPC .... H04L 5/005; H04L 25/0226; H04L 5/0007; H04W 72/005; H04W 72/042; H04W 16/32
See application file for complete search history.

(56) References Cited

U.S. PATENT DOCUMENTS

2012/0113844 A1* 5/2012 Krishnamurthy ..... H04L 1/0026
370/252
2012/0122472 A1* 5/2012 Krishnamurthy ..... H04L 5/0053
455/456.1
(Continued)

FOREIGN PATENT DOCUMENTS

KR    1020110011508    2/2011
KR    1020110033064    3/2011
(Continued)

OTHER PUBLICATIONS

LG Electronics "Resource specific RRM," R1-110382, Jan. 21, 2011, 3GPP.*

*Primary Examiner* — Jae Y Lee
(74) *Attorney, Agent, or Firm* — Dentons US LLP

(57) ABSTRACT

Disclosed in the present invention are a method for estimating a channel in a wireless access system in which a macro cell and a pico cell coexist, and an apparatus for same. More specifically, the present invention comprises the steps of: determining whether a cell-specific reference signal (CRS) that is inserted into a subframe of a pico cell, which corresponds to a multicast broadcast signal frequency network (MBSFN) almost blank subframe (ABS), overlaps with a CRS that is inserted into an MBSFN ABS of the macro cell, when the MBSFN ABS is transmitted from the macro cell; estimating the channel by using a CRS from the pico cell that remains after excluding the CRS that overlaps
(Continued)

with the CRS of the macro cell; and decoding the channel which is received from the subframe of the pico cell by using a channel estimation value.

12 Claims, 13 Drawing Sheets

(51) Int. Cl.
  *H04W 72/04* (2009.01)
  *H04L 5/00* (2006.01)
  *H04W 16/32* (2009.01)
(52) U.S. Cl.
  CPC ......... *H04W 72/042* (2013.01); *H04L 5/0007* (2013.01); *H04W 16/32* (2013.01)

(56) References Cited

U.S. PATENT DOCUMENTS

2013/0279358 A1* 10/2013 Nagata ................ H04W 28/048
  370/252
2014/0064133 A1* 3/2014 Kazmi ................ H04W 24/10
  370/252

FOREIGN PATENT DOCUMENTS

| KR | 1020110134853 | 12/2011 |
| KR | 1020120018325 | 3/2012 |
| WO | 2010087172 | 8/2010 |
| WO | 2011075689 | 6/2011 |

* cited by examiner

FIG. 6
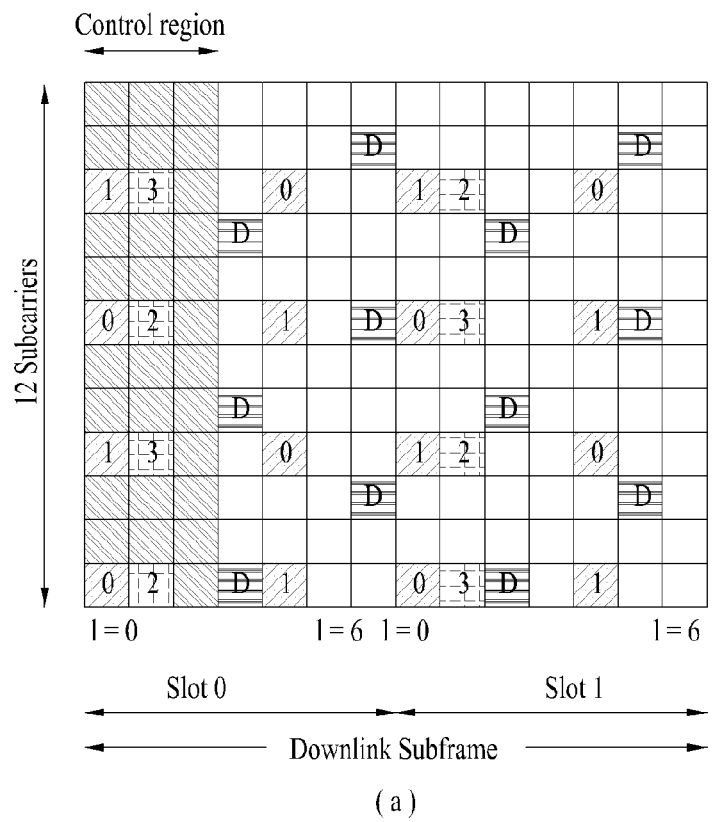
(a)
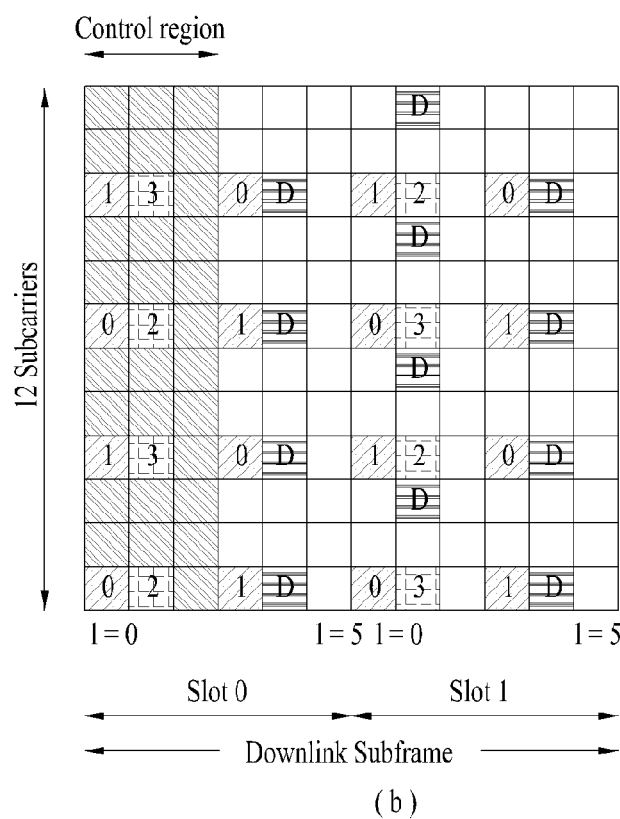
(b)

METHOD FOR ESTIMATING CHANNEL IN WIRELESS ACCESS SYSTEM AND APPARATUS FOR SAME

This application is a 35 USC §371 National Stage entry of International Application No. PCT/KR2012/008807 filed on Oct. 25, 2012, and claims priority to U.S. Provisional Application No. 61/641,843 filed on May 2, 2012, all of which are hereby incorporated by reference in their entireties as if fully set forth herein.

FIELD OF THE INVENTION

The present invention relates to a wireless communication system and, more particularly, to a method for estimating a channel and an apparatus supporting the same in an environment having heterogeneous network base stations coexisting therein.

BACKGROUND ART

The mobile communication system has been developed to ensure activity of the user and to provide audio services. However, the mobile communication system has gradually evolved from not only providing audio services but to providing data services as well, and, recently, the mobile communication system has evolved up to an extent of providing high speed data services. However, in the mobile communication system currently providing services, due to a lack of resources and the users' increasing demand for service provision at a higher speed, a more evolved mobile communication system is being required.

In the requirements for a next generation mobile access system, one of the most important factors is to being capable of supporting a required capacity for a higher data transmission rate. For this, diverse technologies, such as MIMO (Multiple Input Multiple Output), CoMP (Cooperative Multiple Point transmission), relay, and so on, are being researched and developed. Additionally, in order to accommodate the massively increasing required radio data size, a heterogeneous network configured of Macro-Pico or Macro-Femto is being extensively applied.

However, in the heterogeneous network environment, a Pico cell or a Femto cell is located within a Macro cell, and, in this situation, in a user equipment located at a boundary (or edge) of overlapping cells, a problem of having signals being transmitted from each cell act as interference to one another may occur.

DETAILED DESCRIPTION OF THE INVENTION

Technical Objects

An object of the present invention is to propose a method for easily estimating a channel and an apparatus for the same in a wireless access system and, preferably, in an environment having heterogeneous base station coexist therein.

Additionally, an object of the present invention is to propose a method for effectively performing channel estimation and an apparatus for the same in an environment having eICIC (enhanced Inter-Cell Interference Coordination) applied thereto.

The technical objects of the present invention will not be limited only to the objects described above. Accordingly, technical objects that have not been mentioned above or additional technical objects of the present application may become apparent to those having ordinary skill in the art from the description presented below.

Technical Solutions

In an aspect of the present invention, as a channel estimation method of a user equipment in a wireless access system having a macro cell and a pico cell coexisting therein, the channel estimation method includes the steps of determining whether or not a CRS (Cell-specific Reference Signal) being inserted in a subframe of the pico cell respective to a MBSFN ABS overlays with a CRS being inserted in a MBSFN ABS of the macro cell, in case the MBSFN (Multicast Broadcast Single Frequency Network) ABS (Almost Blank Subframe) is being transmitted from the macro cell, performing channel estimation by using remaining CRSs excluding the CRS overlaying with the CRS of the macro cell among the CRSs of the pico cell, and decoding a channel received from a subframe of the pico cell by using the channel estimation value.

In another aspect of the present invention, as a user equipment performing channel estimation in a wireless access system having a macro cell and a pico cell coexisting therein, the user equipment includes a RF (Radio Frequency) unit configured to transmit and receive radio signals, and a processor configured to determine whether or not a CRS (Cell-specific Reference Signal) being inserted in a subframe of the pico cell respective to a MBSFN ABS overlays with a CRS being inserted in a MBSFN ABS of the macro cell, in case the MBSFN (Multicast Broadcast Single Frequency Network) ABS (Almost Blank Subframe) is being transmitted from the macro cell, to perform channel estimation by using remaining CRSs excluding the CRS overlaying with the CRS of the macro cell among the CRSs of the pico cell, and to decode a channel received from a subframe of the pico cell by using the channel estimation value.

Preferably, PDSCH (Physical Downlink Shared Channel) being transmitted from symbol number 3 or number 4 of a subframe of the pico cell may be decoded by using a channel estimation value estimated from a CRS being transmitted from symbol number 4 of a subframe of the pico cell.

Preferably, PDCCH (Physical Downlink Control Channel) being transmitted from a subframe of the pico cell may be decoded by using a channel estimation value estimated from a CRS being transmitted from symbol number 4 of a subframe of the pico cell.

Preferably, in case contiguous first MBSFN ABS and second MBSFN ABS are being transmitted from the macro cell, PDSCH (Physical Downlink Shared Channel) being transmitted from symbol number 3 or number 4 of a second subframe of the pico cell may be decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

Preferably, in case contiguous first MBSFN ABS and second MBSFN ABS are being transmitted from the macro cell, PDSCH (Physical Downlink Shared Channel) being transmitted from symbol number 12 or number 13 of a first subframe of the pico cell may be decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

Preferably, in case contiguous first MBSFN ABS and second MBSFN ABS are being transmitted from the macro cell, PDCCH (Physical Downlink Control Channel) being transmitted from a second subframe of the pico cell may be decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

Effects of the Invention

According to an exemplary embodiment of the present invention, a channel may be easily estimated in a wireless access system and, preferably, in an environment having heterogeneous base station coexist therein.

Additionally, according to the exemplary embodiment of the present invention, in an environment having eICIC applied thereto, by excluding a reference signal in which interference occurs, channel estimation may be effectively performed.

Moreover, according to the exemplary embodiment of the present invention, by performing an effective channel estimation, a throughput performance and a Block Error Rate performance may be enhanced.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

FIG. 6 illustrates an exemplary reference signal pattern being mapped to a downlink resource block (RB) pair, which is defined in a 3GPP LTE system.

BEST MODE FOR CARRYING OUT THE PRESENT INVENTION

Figure 1:
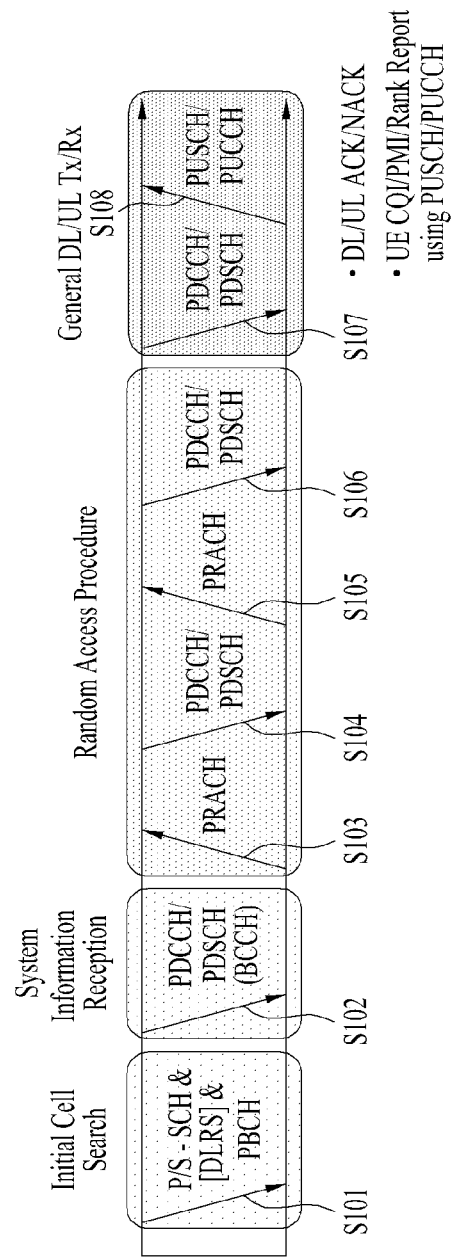
FIG. 1 illustrates physical channels that are used in a 3GPP LTE system and a general signal transmitting method using the same.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. Additionally, the term 'Terminal' may be replaced by terms including UE (User Equipment), MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, D2D device (Device-to-Device) device, and so on.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

In order to clarify the description, although the description has been made based upon 3GGP LTE/LTE-A, the technical features of the present invention will not be limited only to this.

1. 3GPP LTE/LTE-A System to Which the Present Invention can be Applied

1. 1. General System

FIG. 1 illustrates physical channels that are used in a 3GPP LTE system and a general signal transmitting method using the same.

When a power of a user equipment is turned off and then turned back on, or when a user equipment newly enters (or accesses) a cell, the user equipment performs an initial cell search process, such as synchronizing itself with the base station in step S11. For this, the user equipment may receive a P-SCH (Primary Synchronization Channel) and an S-SCH (Secondary Synchronization Channel) from the base station so as to be in synchronization with the base station, and the user equipment may also acquire information, such as cell ID.

Thereafter, the user equipment may receive a PBCH (Physical Broadcast Channel) so as to acquire broadcast information within the cell. Meanwhile, the user equipment may receive DL RS (Downlink Reference Signal), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S12, so as to acquire more detailed system information.

Thereafter, in order to complete the access to the base station, the user equipment may perform a Random Access Procedure, such as in steps S13 and S16 of a later process, so as to complete the access to the base station. In order to do so, the user equipment transmits a preamble through a PRACH (Physical Random Access Channel) (S13), and then the user equipment may receive a response message respective to the random access through the PDCCH and its respective PDSCH (S14). In case of a contention based random access, the user equipment may perform Contention Resolution Procedures, such as transmitting an additional Physical Random Access Channel (PRACH) signal (S15) and receiving a Physical Downlink Control Channel (PDCCH) signal and a Physical Downlink Shared Channel (PDSCH) signal corresponding to the PDCCH signal (S16).

After performing the above-described procedures, the user equipment may receive a Physical Downlink Control Channel (PDCCH) signal and/or Physical Downlink Shared Channel (PDSCH) signal (S17), as a general uplink/downlink signal transmission procedure, and may then perform PUSCH (Physical Uplink Shared Channel) signal and/or PUCCH (Physical Uplink Control Channel) signal transmission (S18).

The control information being transmitted by the user equipment to the base station is collectively referred to as UCI (Uplink Control Information). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on.

In the LTE system, the UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
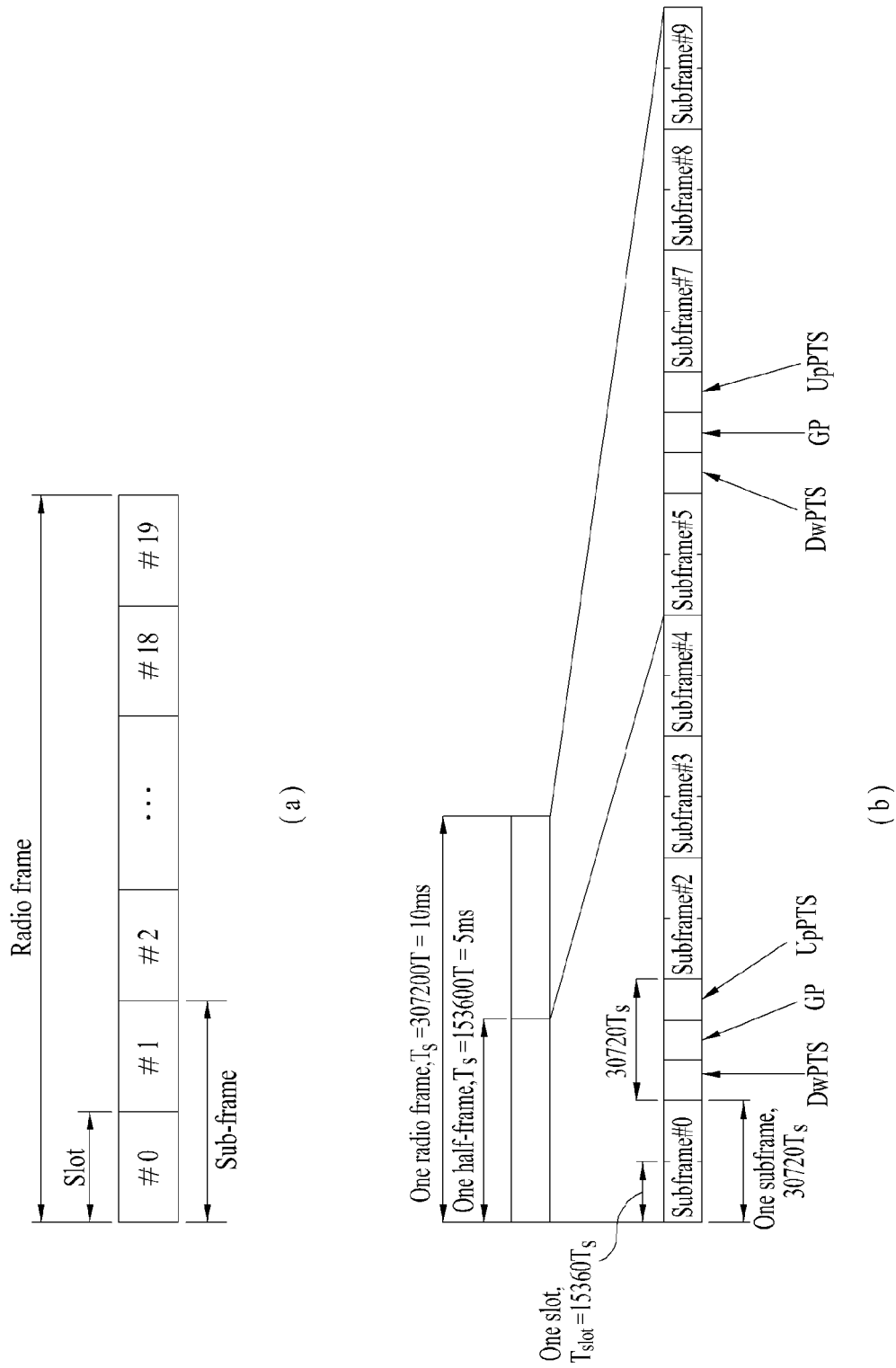
FIG. 2 illustrates a structure of a wireless frame being used in 3GPP LTE.

FIG. 2 illustrates a structure of a wireless frame being used in 3GPP LTE.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE uses the OFDMA in a downlink, an OFDM symbol is used to indicate one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 2 illustrates an exemplary structure of a type 2 radio frame. The type 2 radio frame consists of 2 half frames, and each half frame is configured of 5 general subframes and a DwPTS (Downlink Pilot Time Slot), a Guard Period (GP), and a UpPTS (Uplink Pilot Time Slot), wherein 1 subframe is configured of 2 slots. The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

The above-described structure of the radio frame is merely exemplary. And, therefore, the number of subframes included in the radio frame or the number of slots included in a subframe, and the number of symbols included in one slot may be diversely varied.

Figure 3:
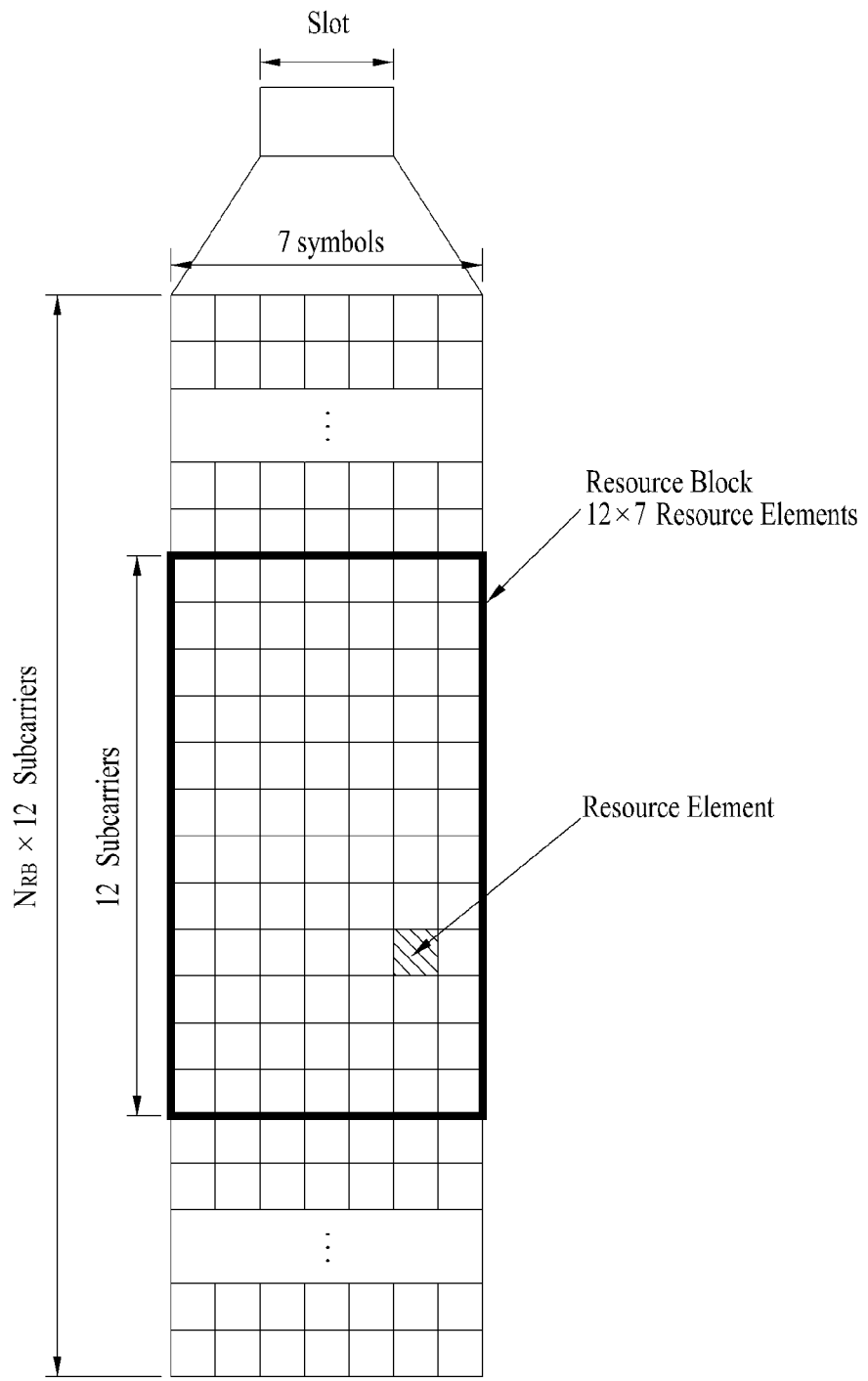
FIG. 3 illustrates an exemplary resource grid of a downlink slot.

FIG. 3 illustrates an exemplary resource grid of a downlink slot.

Referring to FIG. 3, a downlink slot includes multiple OFDM symbols in the time domain. Herein, one downlink slot may include 7 OFDM symbols in a time domain, and a resource block (RB) may include 12 subcarriers in the frequency domain. Although this may be described as an example, the present invention will not be limited only to this.

Each element within the resource grid is referred to as a Resource Element (RE). One resource block includes 12×7 resource elements. $N^{DL}$, which corresponds to a number of resource blocks included in a downlink slot, is dependent to a downlink transmission bandwidth. The structure of an uplink slot may be identical to the structure of the downlink slot.

Figure 4:
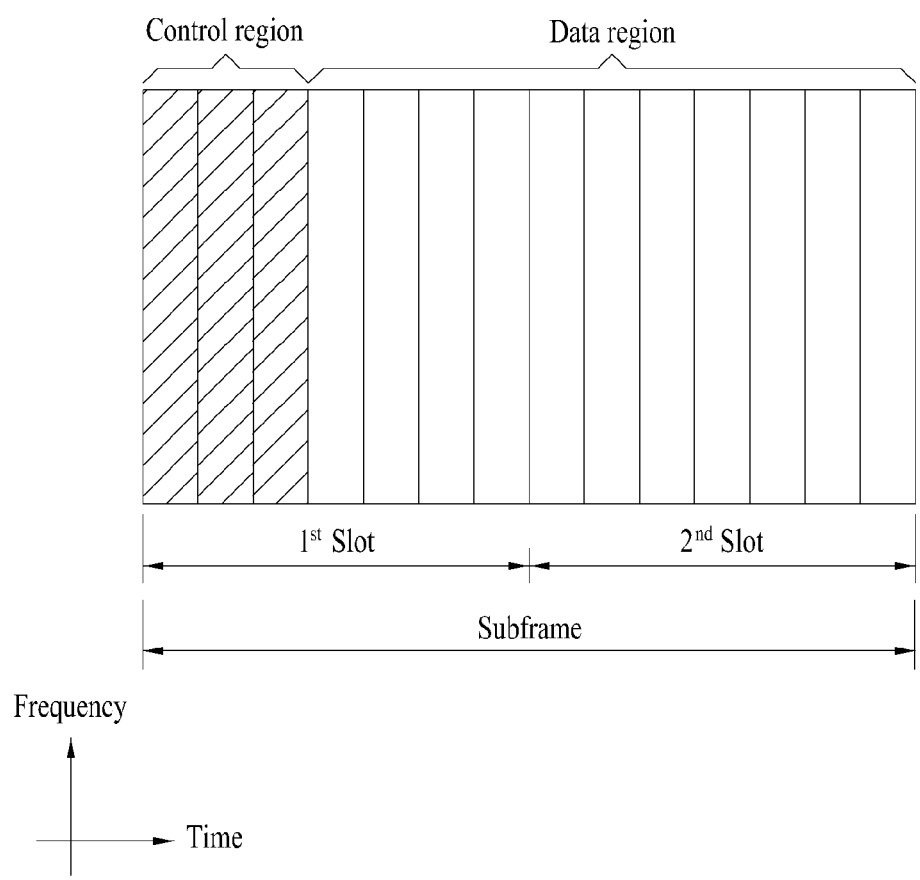
FIG. 4 illustrates a structure of a downlink subframe.

FIG. 4 illustrates a structure of a downlink subframe.

Referring to FIG. 4, a maximum of 3 OFDM symbols located at the front portion (or beginning) of a first slot within one subframe collectively corresponds to a control region, wherein a control channel is allocated (or assigned), and the remaining OFDM symbols collectively correspond to a data region, wherein a PDSCH (Physical Downlink Shared Channel) is assigned. Examples of the downlink control channels that are being used in the LTE system may include a PCFICH (Physical Control Format Indicator Channel), a PDCCH (Physical Downlink Control Channel), a PHICH (Physical Hybrid automatic repeat request Indicator Channel), and so on.

The PCFICH is transmitted from a first OFDM symbol of the subframe, and the PCFICH carries information on the number of OFDM symbols (i.e., size of the control region), which are being used for the transmission of control channels within the subframe. The PHICH corresponds to a response channel respective to the uplink, and the PHICH may carry an ACK (Acknowledgment)/NACK (Not-Acknowledgment) signal respective to an HARQ (Hybrid Automatic Repeat Request). The control information being transmitted through the PDCCH may be referred to as downlink control information (DCI). Herein, the DCI may include uplink resource allocation information, downlink resource allocation information, or an uplink transmission (Tx) power control command respective to an arbitrary user equipment group.

The PDCCH may carry resource allocation and transmission format of a DL-SCH (Downlink Shared Channel) (this is also referred to as a downlink grant.), resource allocation information of an UL-SCH (Uplink Shared Channel) (this is also referred to as an uplink grant.), paging information of a PCH (Paging Channel), system information of the DL-SCH, resource allocation respective to an upper-layer control message, such as a random access response, that is being transmitted over the PDSCH, a collection (or group) of transmission power control commands on individual user equipments within the random user equipment group, information on the activation of a Voice over IP (VoIP), and so on. Multiple PDCCHs may be transmitted within the control region, and, the user equipment may monitor the multiple PDCCHs. Herein, the PDCCH is configured of a collection of one CCE or multiple consecutive CCEs (control channel elements). A CCE corresponds to a logical allocation unit used for providing a PDCCH with a coding rate in accordance with a wireless channel state. Herein, the CCE corresponds to a plurality of resource element groups. The number of formats and available number of bits of a PDCCH may be decided based upon a correlation between the number of CCEs and the coding rate provided by the CCEs.

The base station decides a PDCCH format in accordance with the DCI that is to be transmitted to the user equipment and adds a CRC (Cyclic Redundancy Check) to the control information. Depending upon the owner or purpose of the PDCCH, a unique identifier (this is referred to as an RNTI (Radio Network Temporary Identifier (RNTI).) may be masked to the CRC. In case of a PDCCH for a particular user equipment, a unique identifier of the user equipment, e.g., a C-RNTI (Cell-RNTI) may be masked to the CRC. Alternatively, in case of a PDCCH for a paging message, a paging indicator identifier, e.g., P-RNTI (Paging-RNTI) may be masked to the CRC. In case of a PDCCH for system information and, more particularly, for a system information block (SIB), a system information identifier, SI-RNTI (system information RNTI) may be masked to the CRC. In order to indicate a random access response, which corresponds to a response to the transmission of a random access preamble of the user equipment, a RA-RNTI (random access-RNTI) may be masked to the CRC.

Figure 5:
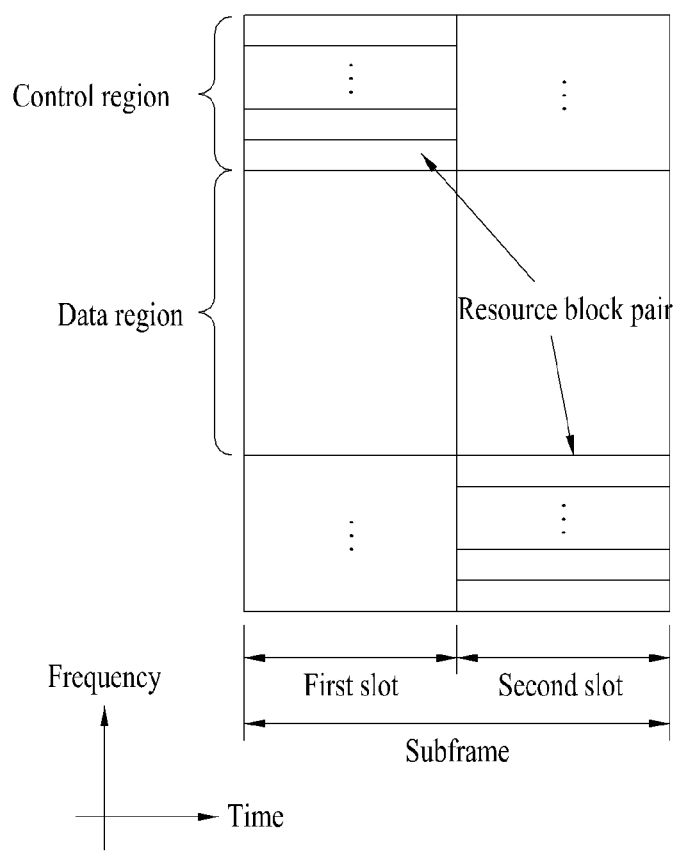
FIG. 5 illustrates a structure of an uplink subframe.

FIG. 5 illustrates a structure of an uplink subframe.

Referring to FIG. 5, a UL subframe may be divided into a data region and a control region in the frequency domain. A PUCCH (Physical Uplink Control Channel), which carries uplink control information, is allocated to the control region. And, a PUSCH (Physical Uplink Shared Channel), which carries user data, is allocated to the data region. In order to maintain the characteristics of a single carrier, one user equipment does not transmit a PUCCH and a PUSCH at the same time. A PUCCH respective to a user equipment is allocated with an RB pair in a subframe. And, the RBs belonging to the RB pair occupy different subcarriers in two slots. This may also be described (or expressed) as the RB pair, which is allocated to the PUCCH, being frequency-hopped at a slot boundary.

1.2. Downlink Reference Signal

In a wireless communication system, since data/signals are being transmitted through a wireless channel, the data/signals may be distorted during the wireless transmission. In order to allow a receiving end to accurately (or correctly) receive the distorted signal(s), it will be preferable to correct the received distorted signal by using channel information. At this point, in order to detect channel information, a receiving end and/or a transmitting end may use a reference signal, which is known to both ends. The reference signal may also be referred to as a pilot signal.

When the transmitting end transceives (or transmits and receives) data by using multiple input/output antennae, in order to allow the receiving end to correctly receive data, it will be preferable to detect channel status between the transmitting antenna and the receiving antenna. At this point, in order to allow the receiving end to detect the channel status, it will be preferable for each transmitting antenna of the transmitting end to have a separate reference signal.

A downlink reference signal may be categorized as a CRS (Common RS), which is shared by all user equipments existing within one cell, and a DRS (Dedicated RS), which is dedicated to one specific user equipment. The transmitting end may provide information for demodulation and channel measurement by using such reference signals (CRS, DRS).

The receiving end (e.g., user equipment) may measure the channel status by using the CRS, and, then, the receiving end may feed-back indicators related to the channel quality, such as CQI (Channel Quality Indicator), PMI (Precoding Matrix Index) and/or RI (Rank Indicator), to the transmitting end (e.g., base station) in accordance with the measured channel status. In the exemplary embodiments of the present invention, the CRS may also be referred to as a cell-specific RS. Conversely, a reference signal related to feedback of the channel status information (CSI) may be referred to as a CSI-RS.

In case data demodulation is required within the PDSCH, the DRS may be transmitted to the user equipments through resource elements. The user equipment may receive information on the existence or absence of a DRS via higher layer signaling. The DRS is valid only when a respective PDSCH signal is mapped to the DRS. In the exemplary embodiments of the present invention, the DRS may also be referred to as a UE-specific RS or a DMRS (Demodulation RS).

FIG. 6 illustrates an exemplary reference signal pattern being mapped to a downlink resource block (RB) pair, which is defined in a 3GPP LTE system.

As a unit having a reference signal mapped thereto, a RB (Resource Block) pair may be set as one subframe in a time domain×12 subcarriers in a frequency domain. More specifically, in a time axis (x-axis), in case of a normal CP (Cyclic Prefix), one RB pair has a length of 14 OFDM symbols (see FIG. 6(a)), and, in case of an extended CP (Cyclic Prefix), one RB pair has a length of 12 OFDM symbols (see FIG. 6(b)).

Referring to FIG. 6, resource elements (REs) that are marked with '0', '1', '2', and '3' in each resource block refer to resource elements each having a CRS corresponding to antenna ports '0', '1', '2', and '3' of a transmitting end (e.g., base station) mapped thereto, and resource elements that are marked with 'D' refer to resource elements each having a DRS mapped thereto.

As a reference signal that can be commonly received to all user equipments located (or existing) within a cell, the CRS is distributed throughout the entire frequency band and may be used for estimating a channel of a physical antenna. Additionally, the CRS may also be used for channel state information (CSI) and data demodulation.

The CRS may be defined in diverse formats in accordance with an antenna alignment in the transmitting end (e.g., base station). In a 3GPP LTE system (e.g., 3GPP Release-8/9), the transmitting end may support up to 4 transmitting antennae.

When a multiple input multiple output antenna is supported, and when reference signals are transmitted from one or more antenna ports, the reference signals are transmitted through specific resource elements in accordance with a predetermined pattern. At this point, when a reference signal for an antenna port is transmitted from a resource element, a reference signal for another antenna port is not transmitted from the corresponding resource element. More specifically, reference signals do not overlay one another between different antennae.

2. Channel Estimation Method

Heterogeneous network/deployments refers to a structure, wherein a micro cell for low power/close range communication coexists in a macro cell based homogeneous network. Although a micro cell may be referred to as a pico cell, a femto cell, a HeNB (Hom evolved Node B), relay, and so on, for simplicity in the following description, the micro cell will be collectively referred to as a micro cell.

A macro cell (or macro base station) has a wide coverage and high transmission power and refers to a general cell (or base station) of a wireless communication system. Additionally, as a small-sized version of a macro cell, a micro cell (or micro base station) may be operated independently while performing most of the functions of the macro cell, and a micro cell refers to a cell (or base station) of a type that can be installed in an area covered by the macro cell (overlay type) or a type that can be installed in a shadow area that cannot be covered by the macro cell (non-overlay type). The micro cell has a narrower coverage and low transmission power as compared to the macro cell, and the micro cell may accommodate a smaller number of user equipments as compared to the macro cell.

A user equipment may receive direct serving from the macro cell, and a user equipment may also receive serving from the micro cell. Additionally, in some cases, a user equipment existing within the coverage of the micro cell may receive serving from the macro cell.

Depending upon limited or unlimited access of the user equipment, the micro cell may be divided into two different types. As a CSG (Closed Subscriber Group) cell, a first type refers to a cell that does not authorize access of a conventional macro user equipment (a user equipment receiving serving from the macro cell) or other micro user equipments (user equipments receiving serving from the micro cell) without authentication. And, as an OASC (Open Access Subscriber Group) or OSC (Open Subscriber Group), a second type refers to a cell that authorizes access of a conventional (or legacy) macro user equipment or other micro user equipments.

In a heterogeneous network environment having a macro cell and a micro cell coexisting therein, critical inter-cell interference may occur as compared to a homogeneous network environment having only a macro cell (or only a micro cell) existing therein. More specifically, in a heterogeneous network environment, in case of a user equipment located as a boundary (or edge) of an overlaying cell, a signal transmitted from each cell may act as interference to one another, thereby causing the channel estimation performance of the user equipment to be degraded. Channel estimation refers to a procedure for recovering a received signal by compensating for a distortion in the signal that occurs due to fading. Herein, fading refers to an abrupt change in signal intensity due to a multi path-time delay in a wireless communication system environment. In order to perform channel estimation, a reference signal that is known to both the transmitting end and the receiving end is required. Additionally, the reference signal may also be referred to as a Pilot signal.

In a 3GPP LTE/LTE-A system, a CRS (Cell-specific Reference Signal) signal is inserted in a first OFDM symbol and in a last third OFDM symbol within each slot along a time axis, and the CRS signal is essentially used for the above-described channel estimation and RSRP (Reference Signal Received Power)/RSRQ (Reference Signal Received Quality). More specifically, in case of a normal cyclic prefix (normal CP), the CRS signal is transmitted through $1^{st}$, $5^{th}$, $8^{th}$, and $12^{th}$ OFDM symbols (Symbols numbers 0, 4, 7, and 11) within each subframe, and, in case of an extended cyclic prefix (extended CP), the CRS signal is transmitted through $1^{st}$, $4^{th}$, $7^{th}$, and $11^{th}$ OFDM symbols (Symbols numbers 0, 3, 6, and 10) within each subframe.

Figure 7:
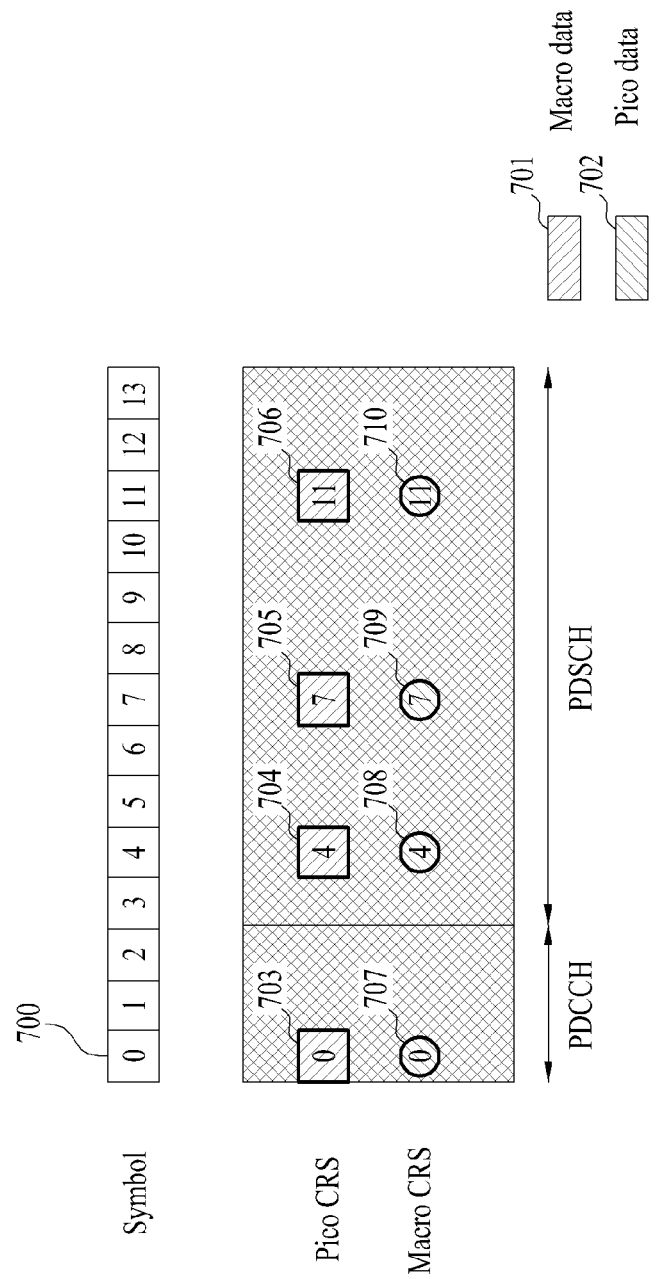
FIG. 7 illustrates an exemplary subframe in a case when a macro CRS and a pico CRS do not overlay one another in a heterogeneous network, wherein a macro cell and a pico cell coexist.

FIG. 7 illustrates an exemplary subframe in a case when a macro CRS and a pico CRS do not overlay one another in a heterogeneous network, wherein a macro cell and a pico cell coexist. Hereinafter, in order to clarify the description, the following description will be given based upon a symbol index (700).

Referring to FIG. 7, each of a pico CRS (703) located in symbol number 0, a pico CRS (704) located in symbol number 4, a pico CRS (705) located in symbol number 7, and a pico CRS (705) located in symbol number 11 does not respectively overlay (or overlap) with a macro CRS (707) located in symbol number 0, a macro CRS (708) located in symbol number 4, a macro CRS (709) located in symbol number 7, and a macro CRS (710) located in symbol number 11.

However, the macro CRSs (707, 708, 709, 710) overlay with pico data (702), and the pico CRSs (703, 704, 705, 706) overlay with macro data (701). Herein, the macro data (701) include both PDCCH and PDSCH of the macro cell, and the pico data (702) include both PDCCH and PDSCH of the pico cell. In this case, channel estimation that is estimated by using the CRS is performed inaccurately, and, since the CRS of a counterpart exists within its own area, the performance is degraded.

Figure 8:
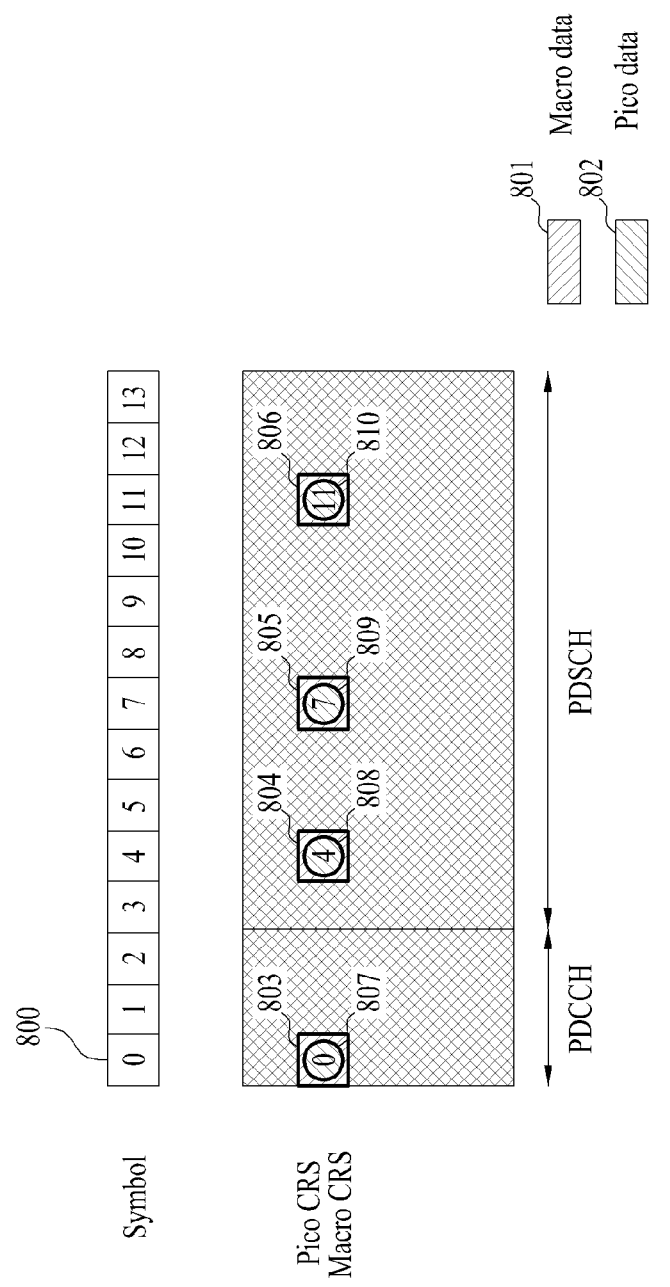
FIG. 8 illustrates an exemplary subframe in a case when a macro CRS and a pico CRS overlay one another in a heterogeneous network, wherein a macro cell and a pico cell coexist.

FIG. 8 illustrates an exemplary subframe in a case when a macro CRS and a pico CRS overlay one another in a heterogeneous network, wherein a macro cell and a pico cell coexist. Hereinafter, in order to clarify the description, the following description will be given based upon a symbol index (800).

Referring to FIG. 8, each of a pico CRS (803) located in symbol number 0, a pico CRS (804) located in symbol number 4, a pico CRS (805) located in symbol number 7, and a pico CRS (805) located in symbol number 11 respectively overlays (or overlaps) with a macro CRS (807) located in symbol number 0, a macro CRS (808) located in symbol number 4, a macro CRS (809) located in symbol number 7, and a macro CRS (810) located in symbol number 11. Additionally, macro data (801) overlay with pico data (802). Herein, the macro data (701) include both PDCCH and PDSCH of the macro cell, and the pico data (702) include both PDCCH and PDSCH of the pico cell. In this case also, channel estimation that is estimated by using the CRS is performed inaccurately, and, since the CRS of a counterpart exists within its own area, the performance is degraded.

Accordingly, in the recent 3GPP LTE-A system, as an inter-BS (Base Station) interference cooperation (or coordination) method, research on eICIC (enhanced Inter-Cell Interference Coordination) is being actively carried out. A cell causing interference is referred to as an Aggressor cell or a Primary Cell, and a cell receiving interference is referred to as a Victim cell or a Secondary Cell, and, the method corresponds to having the Aggressor cell or primary cell stop data transmission in a specific subframe, so that a user equipment can maintain its connection with (or access to) the Victim cell or secondary cell within the corresponding subframe. More specifically, in this method, in case the macro cell and the micro cell coexist, by having the base station of any one cell temporarily stops the signal transmission with respect to a user equipment, which receives extremely intense interference in a particular area, an interference signal is hardly transmitted.

The macro cell may correspond to the Aggressor cell or Primary Cell, and the micro cell may correspond to the Victim cell or Secondary Cell, and, conversely, the micro cell may correspond to the Aggressor cell or Primary Cell, and the macro cell may correspond to the Victim cell or Secondary Cell.

In an LTE-A system having eICIC applied thereto, in order to ensure backward compatibility with an user equipment of a legacy LTE system, instead of applying a separate subframe, a subframe, which is not allocated with remaining portion of data excluding minimum signals that are essentially required for user equipment operations including the CRS, is used. More specifically, the macro cell provides a subframe referred to as an ABS (or ABSF: Almost Blank Subframe) to a user equipment receiving serving from the micro cell and, most particularly, to a user equipment that is located at the boundary of an overlaying cell, and, by not transmitting any downlink control channel and data channel excluding the CRS from the ABS, the ABS may be protected from the intense interference that is caused from the macro cell. However, in case the ABS is identical to an MBSFN (Multicast Broadcast Single Frequency Network) subframe, which does not transmit any signal in a data region, the CRS is not transmitted from the data region of the ABS. More specifically, in case of an MBSFN ABS subframe, by removing remaining CRSs excluding a first CRS (CRS being transmitted from OFDM symbol number 0), inter-CRS interference may be excluded (or disregarded) in the section of OFDM symbol numbers 4, 7, and 11 including the remaining CRSs excluding the first CRS.

Under the eICIC situation, a subframe format of each base station may be known by performing signal exchange through an inter X2 interface connection between the macro cell and the pico cell. For example, the macro cell and the pico cell exchange information on the MBSFN subframe and information on a subframe operating as an ABS via X2 interface based signaling.

Conversely, since an X2 interface does not exist between the macro cell and the femto cell, a pre-defined ABS pattern is applied to the femto cell by a configuration via OAM (Operation, Administration and Maintenance). For example, in order to acquire information on the MBSFN subframe of the macro cell, the femto cell may acquire MBSFN subframe information by receiving system information, which is wirelessly broadcasted, or the femto cell may also acquire MBSFN subframe information of the macro cell from a control station of a core network.

Figure 9:
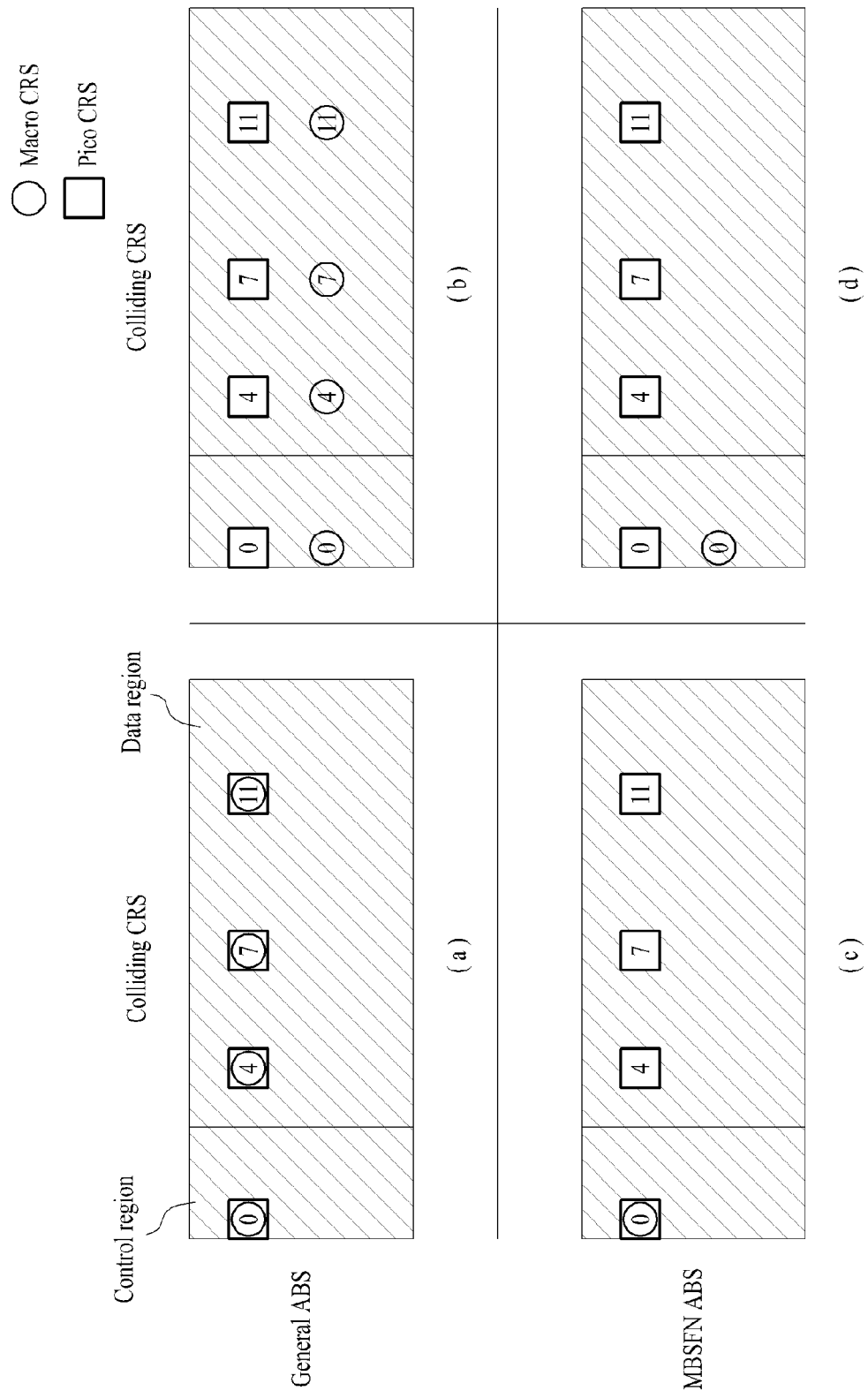
FIG. 9 illustrates an exemplary ABS pattern of a macro cell and a pico cell in a system having eICIC applied thereto.

FIG. 9 illustrates an exemplary ABS pattern of a macro cell and a pico cell in a system having eICIC applied thereto.

Referring to FIG. 9, in case the eICIC is being applied, generally, 4 different cases may exist in accordance with a signal transmission pattern between two base stations. The ABS is not applied to all subframes along the time axis, and a consistent pattern is generated from the network and shared between the base stations. However, in a situation where the user equipment cannot actually know such information, the user equipment operates as scheduled by the base station. With respect to each case, an estimated result of a user equipment that does not consider eICIC (e.g., a user equipment being directly provided with a service from the pico cell, hereinafter referred to as a 'pico user equipment') will hereinafter be described with respect to PDSCH throughput and PDCCH BLER (Block Error Rate) performance.

(a) of FIG. 9 illustrates a case of a general ABS in which a colliding CRS exists (Normal ABS with colliding CRS). More specifically, when the subframe formats of the macro cell and the pico cell both correspond to general subframes, since the CRS location of the macro cell is identical to the CRS location of the pico cell, the CRSs overlay one another, thereby acting as interference to one another. In this case, in light of the PDSCH throughput, channel estimation degradation is high, and, as a result, the user equipment throughput performance degradation also becomes high. Furthermore, in light of the PDCCH BLER performance, the channel estimation degradation of CRS number 0 is high, and the PDCCH BLER performance degradation also becomes high.

(b) of FIG. 9 illustrates a case of a general ABS in which a non-colliding CRS exists (Normal ABS with non-colliding CRS). More specifically, when the subframe formats of the macro cell and the pico cell both correspond to general subframes, since the CRS location of the macro cell and the CRS location of the pico cell are different from one another, influence of the interference between the CRSs does not exist. In this case, in light of the PDSCH throughput, although the channel estimation is normal, since the macro CRS cause interference in the pico data region, degradation of the user equipment throughput performance may exist. Additionally, in light of the PDCCH BLER performance, although the channel estimation of CRS number 0 is normal, since the macro CRS causes influence on the data region of the pico cell, the PDCCH BLER performance degradation may slightly exist.

(c) of FIG. 9 illustrates a case of a MBSFN ABS in which a colliding CRS exists (MBSFN ABS with colliding CRS). More specifically, when the subframe format of the macro cell corresponds to a MBSFN subframe, and when the subframe format of the pico cell corresponds to a general subframe, a case when the CRS being transmitted from symbol number 0 corresponds to the same location is illustrated. Since the subframe format of the macro cell corresponds to a MBSFN subframe, although the CRS of the macro cell does not exist in the remaining symbol numbers 4, 7, and 11, the CRSs being transmitted through symbol number 0 overlay one another, thereby acting as interference to one another. In this case, in light of the PDSCH throughput, due to the interference existing in the CRS number 0, if the CRS number 0 is used for channel estimation, performance degradation may occur in the channel estimation, and the throughput performance may have a larger performance degradation as compared to the case of (b) of FIG. 9. Furthermore, in light of the PDCCH BLER performance, the channel estimation degradation of CRS number 0 is high, and the PDCCH BLER performance degradation also becomes high.

(d) of FIG. 9 illustrates a case of a MBSFN ABS in which a non-colliding CRS exists (MBSFN ABS with non-colliding CRS). When the subframe format of the macro cell corresponds to a MBSFN subframe, and when the subframe format of the pico cell corresponds to a general subframe, a case when the CRS being transmitted from symbol number 0 corresponds to a different location is illustrated. Since the subframe format of the macro cell corresponds to a MBSFN subframe, the CRS of the macro cell does not exist in the remaining symbol numbers 4, 7, and 11, and since the location of the CRS being transmitted through symbol number 0 is different, influence of the interference between the CRSs does not exist. In this case, in light of the PDSCH throughput, since the interference does not exist in the CRS number 0 as well, channel estimation is performed well, and, as a result, the throughput performance is also at a similar level as the throughput performance corresponding to a case when an interference signal caused by the macro cell does not exist. Additionally, in light of the PDCCH BLER performance, although the channel estimation of CRS number 0 is normal, since the macro CRS causes influence on the data region of the pico cell, the PDCCH BLER performance degradation may slightly exist.

As described above, in light of the PDSCH throughput performance, with the exception for the case of (d) of FIG. 9, performance degradation exists in all cases of (a) to (c) of FIG. 9. Additionally, in light of the PDCCH BLER performance, performance degradation exists in all cases. In a system having eICIC applied thereto, in light of the user equipment, in order to gain high PDSCH throughput and PDCCH BLER performance, operations adequate to eICIC are being required. Accordingly, a user equipment reception algorithm adequate to eICIC is being required.

Hereinafter, the present invention proposes a method for effectively performing channel estimation in order to remove PDSCH throughput performance and PDCCH BLER performance degradation in a system having eICIC applied thereto. Most particularly, the present invention proposes a method of a user equipment for selecting a CRS that is used for channel estimation in accordance with an inter-BS ABS pattern in case of a MBSFN ABS in which a colliding CRS exists (MBSFN ABS with colliding CRS), as shown in (c) of FIG. 9. Hereinafter, for simplicity in the description, it will be assumed that a pico user equipment is informed in advance of an ABS pattern that is transmitted from a macro base station or that a pico equipment receives and knows about the information on the ABS pattern via signaling (e.g., RRC (Radio Resource Control) signaling) from a macro/pico base station. Herein, the ABS pattern refers to a pattern indicating whether or not the subframe corresponds to an ABS for each subframe being transmitted from the macro base station, and, based upon such information, the user equipment may be capable of knowing which subframe corresponds to the ABS and whether or not the ABS is contiguous. Additionally, it will be assumed that the pico user equipment is informed in advance of whether the ABS being transmitted from the macro base station corresponds to a MBSFN ABS or a general ABS or that the pico user equipment receives and knows about the information on whether the ABS being transmitted from the macro base station corresponds to a MBSFN ABS or a general ABS via signaling (e.g., RRC (Radio Resource Control) signaling) from a macro/pico base station. For example, within a radio frame, a user equipment may determine subframes excluding subframe numbers 0, 4, 5, and 9 as general ABSs instead of MBSFN ABSs. Alternatively, for simplicity in the description, a case of a normal cyclic prefix (normal CP) will hereinafter be assumed, however, it will be evident that the following description may also be equally applied to an extended cyclic prefix (extended CP).

Figure 10:
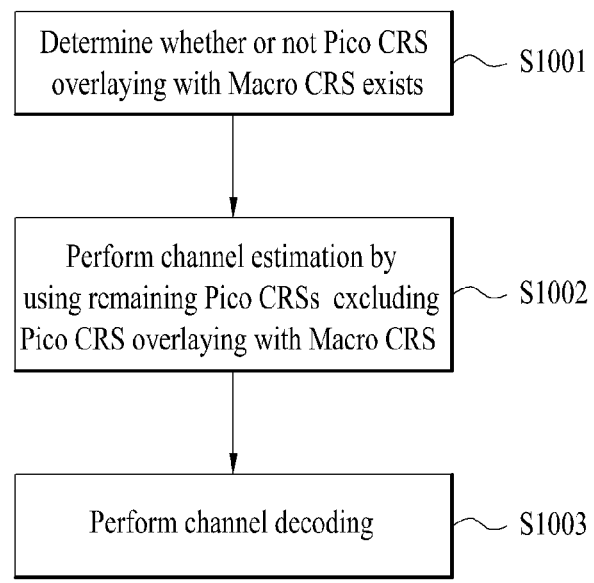
FIG. 10 illustrates an exemplary method for estimating a channel according to an exemplary embodiment of the present invention.

FIG. 10 illustrates an exemplary method for estimating a channel according to an exemplary embodiment of the present invention. Hereinafter, for clarity in the description, indexes number 0 to number 13 will be sequentially assigned to symbols configuring a subframe, and the following description will be given based upon the assigned indexes.

Referring to FIG. 10, when a pico user equipment receives data (PDCCH or PDSCH) being transmitted from a pico base station, the pico user equipment determines whether or not a pico CRS being inserted in the data overlays with a macro CRS being transmitted from the macro base station (S1001). More specifically, the pico user equipment determines whether or not a macro CRS of symbol number 0 included in a MBSFN ABS, which is received from the macro base station, overlays with a pico CRS of symbol number 0, which is received from the pico base station. Herein, the pico user equipment may receive an OFDM symbol being transmitted from the pico base station or macro base station and remove the cyclic prefix, and the pico user equipment may know the CRS via FFT (Fast Fourier Transform) calculation.

In case a pico CRS overlaying with a macro CRS exists, the pico user equipment performs channel estimation by using remaining pico CRSs excluding the pico CRS that overlays with the macro CRS (S1003). More specifically, the pico user equipment performs channel estimation by using the remaining pico CRSs excluding the pico CRS being transmitted from symbol number 0. The channel estimation method of the pico user equipment will be described later on in more detail. Additionally, although it is not shown in the drawing, in step S1001, in case a pico CRS overlaying with a macro CRS does not exist, the pico user equipment may perform channel estimation by equally using the conventional method.

Subsequently, the user equipment performs channel decoding by using the estimated channel value (S1005). More specifically, the user equipment performs equalization by using the estimated channel value and, then, performs demodulation on the equalization result, and, then, the user equipment performs decoding on the received data (PDCCH or PDSCH).

For simplicity in the description, assumptions on a subframe ABS pattern being transmitted from the macro base station may be made as described below.

First of all, ABS Pattern 1 signifies that an ABS being contiguously transmitted corresponds to one subframe. For example, the ABS Pattern 1 may be indicated as '1000_0000', and, herein, '1' signifies a subframe to which the macro base station applies an ABS, and '0' signifies a subframe that is normally operated. Additionally, ABS Pattern 2 signifies that ABSs being contiguously transmitted correspond to two subframes. For example, the ABS Pattern 2 may be indicated as '1100_0000'. For simplicity in the description, only a case when the number of ABSs being contiguous transmitted is equal to or smaller than 2 will be given as an example, however, it will be evident that he present invention can also be applied to a case when N number of ABSs are contiguously transmitted, and, in case N number of ABSs are contiguously transmitted, the solution respective to ABS Pattern 2 may be equally applied. Optimal channel estimation may be performed by configuring a CRS structure that is used for channel estimation in accordance with each ABS pattern as described below.

2. 1. In Case the Number of ABSs is Equal to 1

Figure 11:
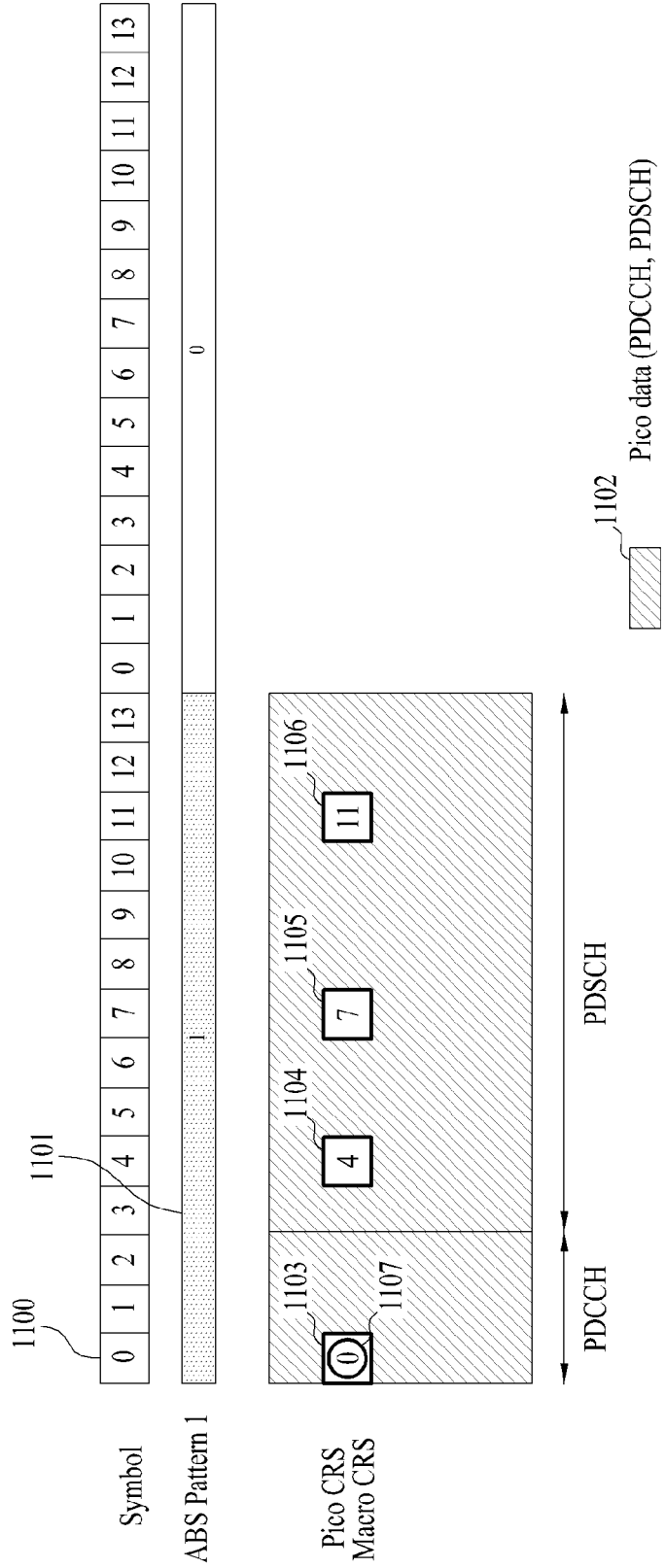
FIG. 11 illustrates an exemplary MBSFN ABS having a colliding CRS, in a case when a contiguous ABS corresponds to one subframe according to an exemplary embodiment of the present invention.

FIG. 11 illustrates an exemplary MBSFN ABS having a colliding CRS, in a case when a contiguous ABS corresponds to one subframe according to an exemplary embodiment of the present invention. Hereinafter, in order to clarify the description, the following description will be given based upon a symbol index (1100).

Referring to FIG. 11, in ABS Pattern 1 (1101), '1' signifies a MBSFN subframe to which the macro base station applies an ABS, and '0' signifies a subframe that is normally operated. With the exception for symbol number 0, although the CRS of the macro cell does not exist in the remaining symbol numbers 4, 7, and 11, a macro CRS (1107) located in symbol number 0 overlays with a pico CRS (1103).

The pico user equipment may acquire channel estimation information of a symbol (or RE) to which CRS is not allocated (or assigned) by performing interpolation or averaging on neighboring symbols to which CRS is allocated.

First of all, in light of PDSCH throughput, when interpolation (or averaging) is performed in a time domain, in order to recover data being transmitted from symbol number 3 (or data being transmitted from symbols number 3, number 4), channel estimation values acquired from a CRS (1103) being transmitted from symbol number 0 and a CRS (1104) being transmitted from symbol number 4 are generally used.

However, an inaccurate channel estimation may occur in the CRS (1103) being transmitted from symbol number 0 due to interference of a macro CRS (1107) being transmitted from the macro base station through symbol number 0, and, due to such inaccurate channel estimation, performance may be actually degraded. In order to prevent this, the pico user equipment may exclude the CRS (1103) being transmitted from symbol number 0 from the channel estimation. More specifically, the pico user equipment may perform channel estimation and data recovery by using only the CRSs (1104, 1105, 1106) being respectively transmitted from symbols number 4, number 7, and number 11. More specifically, in order to recover data being transmitted from symbol number 3 (or data being transmitted from symbols number 3, number 4), the pico user equipment may use a channel estimation value that is acquired from the CRS (1104) being transmitted from symbol number 4, or, based upon the interpolation (or averaging) in the time domain, the pico user equipment may use channel estimation values acquired from CRSs (1104, 1105) being transmitted from symbols number 4 and number 7, or from CRSs (1104, 1106) being transmitted from symbols number 4 and number 11, or from CRSs (1104, 1105, 1106) being transmitted from symbols number 4, number 7, and number 11.

In light of PDCCH BLER performance, in order to recover data (PDCCH) being transmitted from symbols number 0, number 1, and number 2, the pico user equipment generally uses a channel estimation value that us acquired by using a CRS (1103) being transmitted from symbol number 0.

However, performance of channel estimation may be degraded in the CRS (1103) being transmitted from symbol number 0 due to interference of a macro CRS (1107) being transmitted from the macro base station through symbol number 0, and, due to such performance degradation, PDCCH performance may be actually degraded. In order to prevent this, the pico user equipment may use a channel estimation value acquired from a CRS (1104) being transmitted from symbol number 4, which is not influenced by the CRS interference being transmitted from the macro base station and, which is located within the closest range. More specifically, in order to recover the data (PDCCH) being transmitted from symbols number 0, number 1, and number 2, the pico user equipment may use a channel estimation value acquired from the CRS (1104) being transmitted from symbol number 4.

Additionally, based upon the interpolation (or averaging) in the time domain, in addition to the CRS (1104) being transmitted from symbol number 4, the pico user equipment may also use CRSs (1105, 1106) being transmitted from symbol number 7 or number 11. For example, in order to recover the data (PDCCH) being transmitted from symbols number 0, number 1, and number 2, the pico user equipment may use channel estimation values acquired from CRSs (1104, 1105) being transmitted from symbols number 4 and number 7, or from CRSs (1104, 1106) being transmitted from symbols number 4 and number 11, or from CRSs (1104, 1105, 1106) being transmitted from symbols number 4, number 7, and number 11.

2.2. In Case the Number of ABSs is Equal to 2

Figure 12:
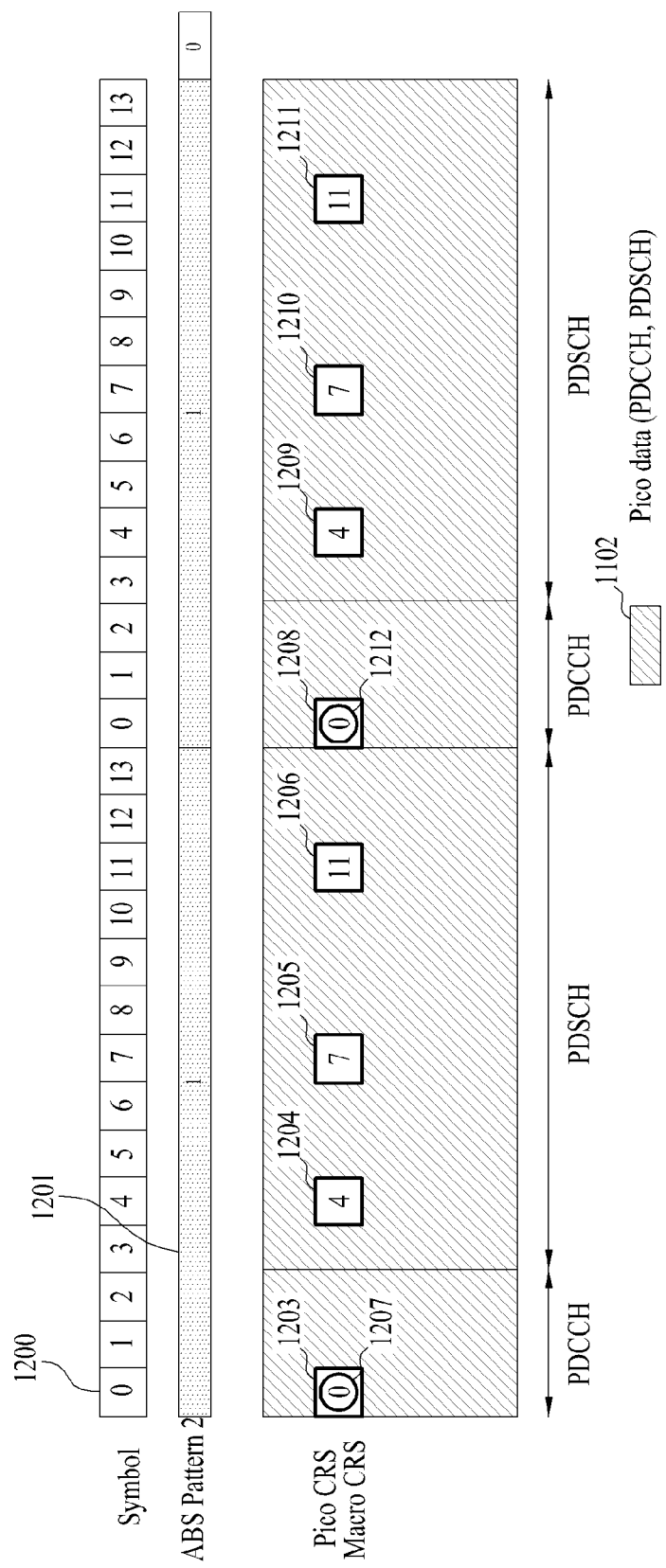
FIG. 12 illustrates an exemplary MBSFN ABS having a colliding CRS, in a case when a contiguous ABS corresponds to two subframes according to an exemplary embodiment of the present invention.

FIG. 12 illustrates an exemplary MBSFN ABS having a colliding CRS, in a case when a contiguous ABS corresponds to two subframes according to an exemplary embodiment of the present invention. Hereinafter, in order to clarify the description, the following description will be given based upon a symbol index (1200).

Referring to FIG. 12, in ABS Pattern 2 (1201), '1' signifies a MBSFN subframe to which the macro base station applies an ABS, and '0' signifies a subframe that is normally operated. With the exception for symbol number 0, although the CRS of the macro cell does not exist in the remaining symbol numbers 4, 7, and 11, a macro CRSs (1207, 1212) located in symbol number 0 of each subframe respectively overlays with each pico CRS (1203, 1208).

As described above, the pico user equipment may acquire channel estimation information of a symbol (or RE) to which CRS is not allocated (or assigned) by performing interpolation or averaging on neighboring symbols to which CRS is allocated.

First of all, in light of PDSCH throughput, when interpolation (or averaging) is performed in a time domain, in order to recover data being transmitted from symbol number 3 (or data being transmitted from symbols number 3, number 4), channel estimation values acquired from each CRS (1203, 1208) being transmitted from symbol number 0 and each CRS (1204, 1209) being transmitted from symbol number 4 are generally used.

However, an inaccurate channel estimation may occur in the CRS (1203) being transmitted from symbol number 0 of a first ABS section due to interference of a macro CRS (1207) being transmitted from the macro base station through symbol number 0, and, due to such inaccurate channel estimation, performance may be actually degraded. In order to prevent this, the pico user equipment may exclude the CRS (1203) being transmitted from symbol number 0 of the first ABS section from the channel estimation. More specifically, the pico user equipment may perform channel estimation and data recovery by using only the CRSs (1204, 1205, 1206) being respectively transmitted from symbols number 4, number 7, and number 11 of the first ABS section. More specifically, in order to recover data being transmitted from symbol number 3 of the first ABS section (or data being transmitted from symbols number 3, number 4), the pico user equipment may use a channel estimation value that is acquired from the CRS (1204) being transmitted from symbol number 4 of the first ABS section, or, based upon the interpolation (or averaging) in the time domain, the pico user equipment may use channel estimation values acquired from CRSs (1204, 1205) being transmitted from symbols number 4 and number 7 of the first ABS section, or from CRSs (1204, 1206) being transmitted from symbols number 4 and number 11 of the first ABS section, or from CRSs (1204, 1205, 1206) being transmitted from symbols number 4, number 7, and number 11 of the first ABS section.

Additionally, an inaccurate channel estimation may also occur in the CRS (1208) being transmitted from symbol number 0 of a second ABS section due to interference of a CRS (1212) being transmitted from the macro base station through symbol number 0, and, due to such inaccurate channel estimation, performance may be actually degraded. In order to prevent this, in order to recover data being transmitted from symbol number 12 and symbol number 13 of the first ABS section (subframe), the pico user equipment may exclude the CRS (1208) being transmitted from symbol number 0 of the second ABS section from the channel estimation. More specifically, the pico user equipment may perform channel estimation and data recovery by using the CRS (1206) being transmitted from symbol number 11 of the first ABS section and the CRSs (1209, 1210, 1211) being respectively transmitted from symbols number 4, number 7, or number 11 of the second ABS section. Additionally, the pico user equipment may perform channel estimation and data recovery by using two or more CRSs, among the CRSs (1209, 1210, 1211) being respectively transmitted from symbols number 4, number 7, and number 11 of the second ABS section, along with the CRS (1206) being transmitted from symbol number 11 of the first ABS section. The above-described method may be equally applied to a contiguous ABS section (N number of contiguous ABS subframes).

Furthermore, in order to recover data being transmitted from symbol number 3 of the second ABS section (subframe) (or data being transmitted from symbols number 3, number 4), the CRS (1208) being transmitted from symbol number 0 of the second ABS section may be excluded from the channel estimation. More specifically, the pico user equipment may perform channel estimation and data recovery by using the CRS (1206) being transmitted from symbol number 11 of the first ABS section and the CRSs (1209, 1210, 1211) being respectively transmitted from symbols number 4, number 7, or number 11 of the second ABS section. Additionally, the pico user equipment may also perform channel estimation and data recovery by using two or more CRSs, among the CRSs (1209, 1210, 1211) being respectively transmitted from symbols number 4, number 7, and number 11 of the second ABS section, along with the CRS (1206) being transmitted from symbol number 11 of the first ABS section. The above-described method may be equally applied to a contiguous ABS section (N number of contiguous ABS subframes).

In light of PDCCH BLER performance, in order to recover data (PDCCH) being transmitted from symbols number 0, number 1, and number 2, the pico user equipment generally uses a channel estimation value that us acquired by using each CRS (1203, 1208) being transmitted from symbol number 0.

However, performance of channel estimation may be degraded in the CRS (1203) being transmitted from symbol number 0 of the first ABS section due to interference of the CRS (1207) being transmitted from the macro base station through symbol number 0, and, due to such performance degradation, PDCCH performance may be actually degraded. In order to prevent this, the pico user equipment may use a channel estimation value acquired from a CRS (1204) being transmitted from symbol number 4 of the first ABS section, which is not influenced by the CRS interference being transmitted from the macro base station and, which is located within the closest range. More specifically, in order to recover the data (PDCCH) being transmitted from symbols number 0, number 1, and number 2 of the first ABS section, the pico user equipment may use a channel estimation value acquired from the CRS (1204) being transmitted from symbol number 4 of the first ABS section.

Additionally, based upon the interpolation (or averaging) in the time domain, in addition to the CRS (1204) being transmitted from symbol number 4 of the first ABS section, the pico user equipment may also use CRSs (1205, 1206) being transmitted from symbol number 7 or number 11 of the first ABS section. For example, in order to recover the data (PDCCH) being transmitted from symbols number 0, number 1, and number 2 of the first ABS section, the pico user equipment may use channel estimation values acquired from CRSs (1204, 1205) being transmitted from symbols number 4 and number 7 of the first ABS section, or from CRSs (1204, 1206) being transmitted from symbols number 4 and number 11 of the first ABS section, or from CRSs (1204, 1205, 1206) being transmitted from symbols number 4, number 7, and number 11 of the first ABS section.

Moreover, performance of channel estimation may also be degraded in the CRS (1208) being transmitted from symbol number 0 of the second ABS section due to interference of the CRS (1212) being transmitted from the macro base station through symbol number 0, and, due to such performance degradation, PDCCH performance may be actually degraded. In order to prevent this, the above-described method for recovering data (PDCCH) being transmitted from symbols number 0, number 1, and number 2 of the first ABS section may be equally applied. More specifically, in order to recover data (PDCCH) being transmitted from symbols number 0, number 1, and number 2 of the second ABS section, the pico user equipment may use a channel estimation value acquired by using the CRS (1209) being transmitted from symbol number 4 of the second ABS section or, in addition to the CRS (1209) being transmitted from symbol number 4 of the second ABS section, the pico user equipment may also use CRSs (1210, 1211) being transmitted from symbol number 7 or number 11 of the second ABS section.

Furthermore, the pico user equipment may perform channel estimation and data recovery by using the CRS (1206) being transmitted from symbol number 11 of the first ABS section and the CRSs (1209, 1210, 1211) being respectively transmitted from symbols number 4, number 7, or number 11 of the second ABS section. Additionally, the pico user equipment may also perform channel estimation and data recovery by using two or more CRSs, among the CRSs (1209, 1210, 1211) being respectively transmitted from symbols number 4, number 7, and number 11 of the second ABS section, along with the CRS (1206) being transmitted from symbol number 11 of the first ABS section. The above-described method may be equally applied to a contiguous ABS section (N number of contiguous ABS subframes).

3. General Description of a Device to which the Present Invention May be Applied FIG. 13 a block view showing a structure of a wireless communication device according to an exemplary embodiment of the present invention.

Figure 13:
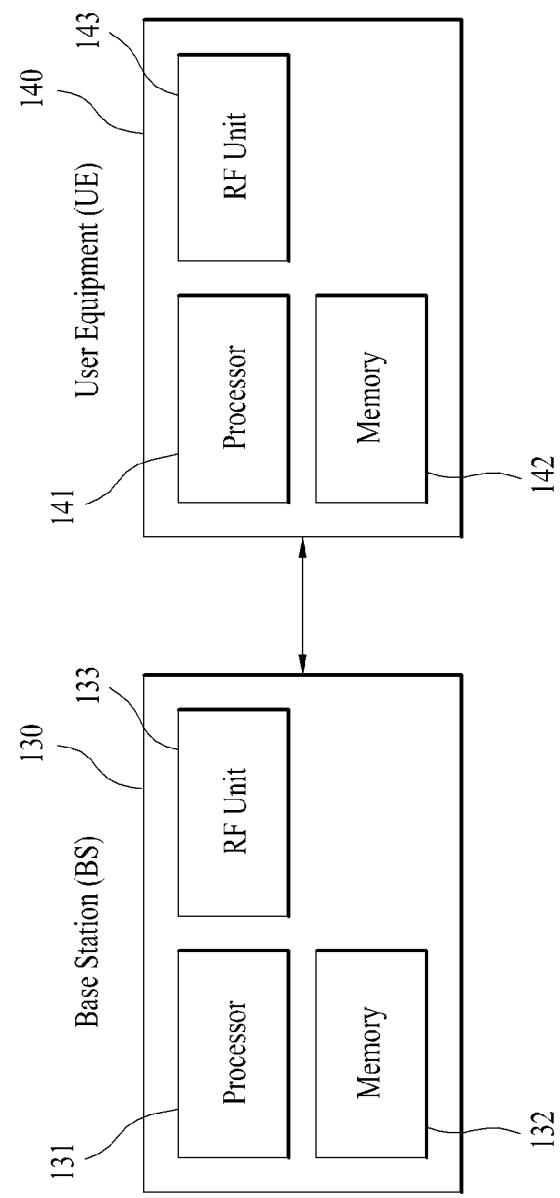
FIG. 13 illustrates a block view of a structure of a wireless communication device according to an exemplary embodiment of the present invention.

Referring to FIG. 13, a wireless communication device includes a base station (130) and multiple user equipments (140) located within the base station (130) area.

The base station (130) includes a processor (131), a memory (132), and an RF module (133). The processor (131) realizes the proposed functions, procedures, and/or methods. Layer of the wireless interface protocol may be realized by the processor (131). The memory (132) is connected to the processor (131) and stores diverse information for operating the processor (131). The RF unit (133) is connected to the processor (131) and transmits and/or receives radio signals.

The user equipment (140) includes a processor (141), a memory (142), and an RF module (143). The processor (141) realizes the proposed functions, procedures, and/or methods. Layer of the wireless interface protocol may be realized by the processor (141). The memory (142) is connected to the processor (141) and stores diverse information for operating the processor (141). The RF unit (143) is connected to the processor (141) and transmits and/or receives radio signals.

The memory (132, 142) may be provided inside or outside of the processor (131, 141) and may be connected to the processor (131, 141) through diverse well-known means. Furthermore, the base station (130) and/or the user equipment (140) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a method for transmitting data in a wireless communication system of the present invention is described based upon an example that can be applied to a 3GPP LTE system, the method of the present invention may also be applied to a variety of other radio access system in addition to the 3GPP LTE system.

What is claimed is:

1. A method of estimating a channel in a wireless access system having a macro cell and a pico cell coexisting therein, the method performed by a user equipment and comprising:
   determining whether or not a CRS (Cell-specific Reference Signal) being inserted in a subframe of the pico cell respective to the MBSFN ABS overlays with a CRS being inserted in a MBSFN ABS of the macro cell, when a MBSFN (Multicast Broadcast Single Frequency Network) ABS (Almost Blank Subframe) is being transmitted from the macro cell;
   performing channel estimation by using remaining CRSs excluding the CRS overlaying with the CRS of the macro cell among the CRSs of the pico cell; and
   decoding a channel received from a subframe of the pico cell by using the channel estimation value.

2. The method of claim 1, wherein PDSCH (Physical Downlink Shared Channel) being transmitted from symbol number 3 or number 4 of a subframe of the pico cell is decoded by using a channel estimation value estimated from a CRS being transmitted from symbol number 4 of a subframe of the pico cell.

3. The method of claim 1, wherein PDCCH (Physical Downlink Control Channel) being transmitted from a subframe of the pico cell is decoded by using a channel estimation value estimated from a CRS being transmitted from symbol number 4 of a subframe of the pico cell.

4. The method of claim 1, wherein, in case contiguous first MBSFN ABS and second MBSFN ABS are being transmitted from the macro cell, PDSCH (Physical Downlink Shared Channel) being transmitted from symbol number 3 or number 4 of a second subframe of the pico cell is decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

5. The method of claim 1, wherein, in case contiguous first MBSFN ABS and second MBSFN ABS are being transmitted from the macro cell, PDSCH (Physical Downlink Shared Channel) being transmitted from symbol number 12 or number 13 of a first subframe of the pico cell is decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

6. The method of claim 1, wherein, in case contiguous first MBSFN ABS and second MBSFN ABS are being transmitted from the macro cell, PDCCH (Physical Downlink Control Channel) being transmitted from a second subframe of the pico cell is decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

7. A user equipment performing channel estimation in a wireless access system having a macro cell and a pico cell coexisting therein, the user equipment comprising:
   a RF (Radio Frequency) unit configured to transmit and receive radio signals; and
   a processor configured to:
   determine whether or not a CRS (Cell-specific Reference Signal) being inserted in a subframe of the pico cell respective to a MBSFN ABS overlays with a CRS being inserted in a MBSFN ABS of the macro cell, in case the MBSFN (Multicast Broadcast Single Frequency Network) ABS (Almost Blank Subframe) is being transmitted from the macro cell;
   perform channel estimation by using remaining CRSs excluding the CRS overlaying with the CRS of the macro cell among the CRSs of the pico cell; and
   decode a channel received from a subframe of the pico cell by using the channel estimation value.

8. The user equipment of claim 7, wherein the processor decodes PDSCH (Physical Downlink Shared Channel) being transmitted from symbol number 3 or number 4 of a subframe of the pico cell by using a channel estimation value estimated from a CRS being transmitted from symbol number 4 of a subframe of the pico cell.

9. The user equipment of claim 7, wherein the processor decodes PDCCH (Physical Downlink Control Channel) being transmitted from a subframe of the pico cell by using a channel estimation value estimated from a CRS being transmitted from symbol number 4 of a subframe of the pico cell.

10. The user equipment of claim 7, wherein, in case contiguous first MBSFN ABS and second MBSFN ABS are being transmitted from the macro cell, the processor decodes PDSCH (Physical Downlink Shared Channel) being transmitted from symbol number 3 or number 4 of a second subframe of the pico cell by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

11. The user equipment of claim 7, wherein, in case contiguous first MBSFN ABS and second MBSFN ABS are being transmitted from the macro cell, the processor decodes PDSCH (Physical Downlink Shared Channel) being transmitted from symbol number 12 or number 13 of a first subframe of the pico cell by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

12. The user equipment of claim 7, wherein, in case contiguous first MBSFN ABS and second MBSFN ABS are being transmitted from the macro cell, the processor decodes PDCCH (Physical Downlink Control Channel) being transmitted from a second subframe of the pico cell is decoded by using a channel estimation value calculated from a CRS being transmitted from symbol number 11 of a first subframe of the pico cell respective to the first MBSFN ABS and a CRS being transmitted from symbol number 4 of a second subframe of the pico cell respective to the second MBSFN ABS.

* * * * *